United States Patent [19]

Hebert

[11] Patent Number: 5,323,671
[45] Date of Patent: Jun. 28, 1994

[54] RATCHET TOOL

[76] Inventor: Freddie P. Hebert, 10890 Cherry Hill Ave., Baton Rouge, La. 70816

[21] Appl. No.: 90,233

[22] Filed: Jul. 6, 1993

[51] Int. Cl.⁵ .......................................... B25B 13/52
[52] U.S. Cl. .......................................... 81/64; 81/65
[58] Field of Search .................. 81/64, 65, 65.2, 3.43

[56] References Cited

U.S. PATENT DOCUMENTS

| 1,383,123 | 6/1921 | Jones | 81/64 |
| 2,995,965 | 8/1961 | Hockney | 81/64 |
| 3,465,622 | 9/1969 | Winans | 81/3.43 X |
| 3,728,916 | 4/1973 | Brantley | 81/64 |
| 5,090,274 | 2/1992 | Schaub | 81/64 |

FOREIGN PATENT DOCUMENTS 2229949 10/1990 United Kingdom ................ 81/64

Primary Examiner—D. S. Meislin
Attorney, Agent, or Firm—Reginald F. Roberts, Jr.

[57] ABSTRACT

A tool for use with a ratchet wrench for removing and/or installing various types and sizes of fuel and oil filters, unscrewing and/or screwing different sizes of threaded pipe, turning and/or twisting fence posts, and moving and/or rolling logs. The tool has a belt or strap, with a buckle at one end and a magnet at the other end. The buckle grips the ratchet of a ratchet wrench and the belt is wrapped around the filter, pipe, post, or log. When the handle of the ratchet wrench is moved, the buckle is pressed against the filter, pipe, post, or log, causing it to turn as the ratchet is turned. The magnet makes for more secure contact between the belt and a filter or pipe, which are made of metal.

8 Claims, 3 Drawing Sheets

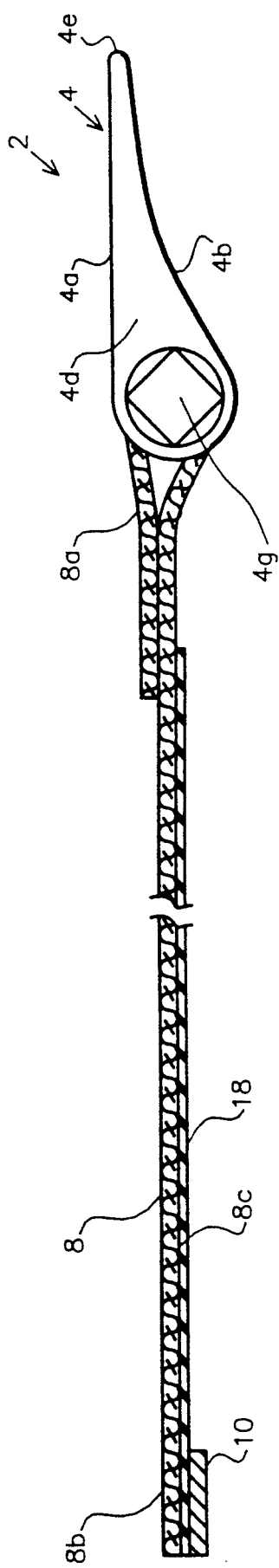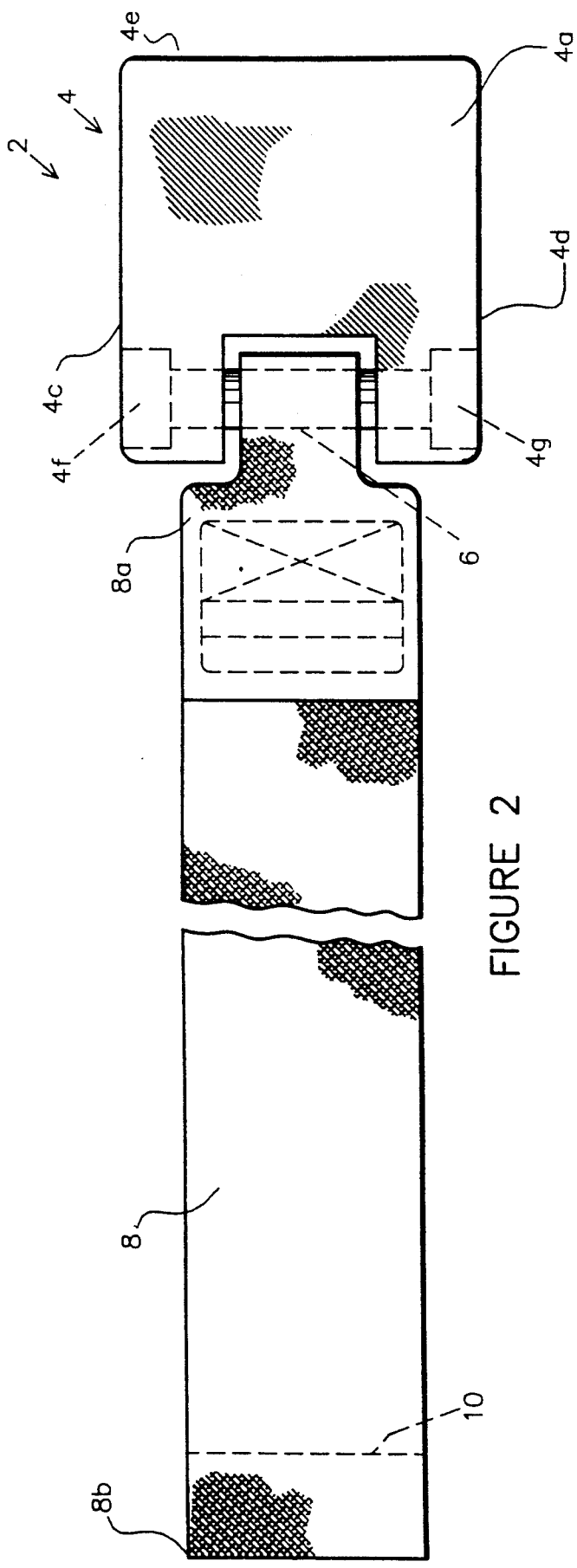
FIGURE 1
FIGURE 2

RATCHET TOOL

BACKGROUND OF THE INVENTION

The present invention relates to a mechanical tool. More particularly, the invention relates to a tool for use in combination with a ratchet wrench.

SUMMARY OF THE INVENTION

In general, the present invention provides a tool for use with a ratchet wrench for turning a workpiece. The ratchet wrench has a ratchet connected to a handle. The tool comprises a rigid plate-like member; a rigid, straight elongated member, and an elongated flexible member. The plate-like member has a planar face and a concave face, and first, second, and third sides. The first and second sides of the plate-like member are substantially parallel to one another, and the third side is substantially perpendicular to the first and second sides. The first side includes a square indentation constructed and arranged to engage the ratchet of the ratchet wrench. The straight elongated member connects the indentation in the first side to the second side of the plate-like member. The elongated flexible member has first and second ends. The first end of the elongated flexible member is connected to the straight elongated member. The tool is constructed and arranged so that, when the elongated flexible member is wrapped around the workpiece to be turned, when the ratchet is engaged by the indentation in the first side of the plate-like member, and when the handle of the ratchet wrench is moved to turn the ratchet, the concave surface of the elongated rigid member is pressed against the workpiece and causes the workpiece to turn as the ratchet is turned.

BRIEF DESCRIPTION OF THE DRAWINGS

FIG. 1 is a side elevation of a ratchet tool made in accordance with the principles of the present invention.

FIG. 2 is a plan view of the tool shown in FIG. 1.

DETAILED DESCRIPTION OF THE INVENTION

Figure 3:
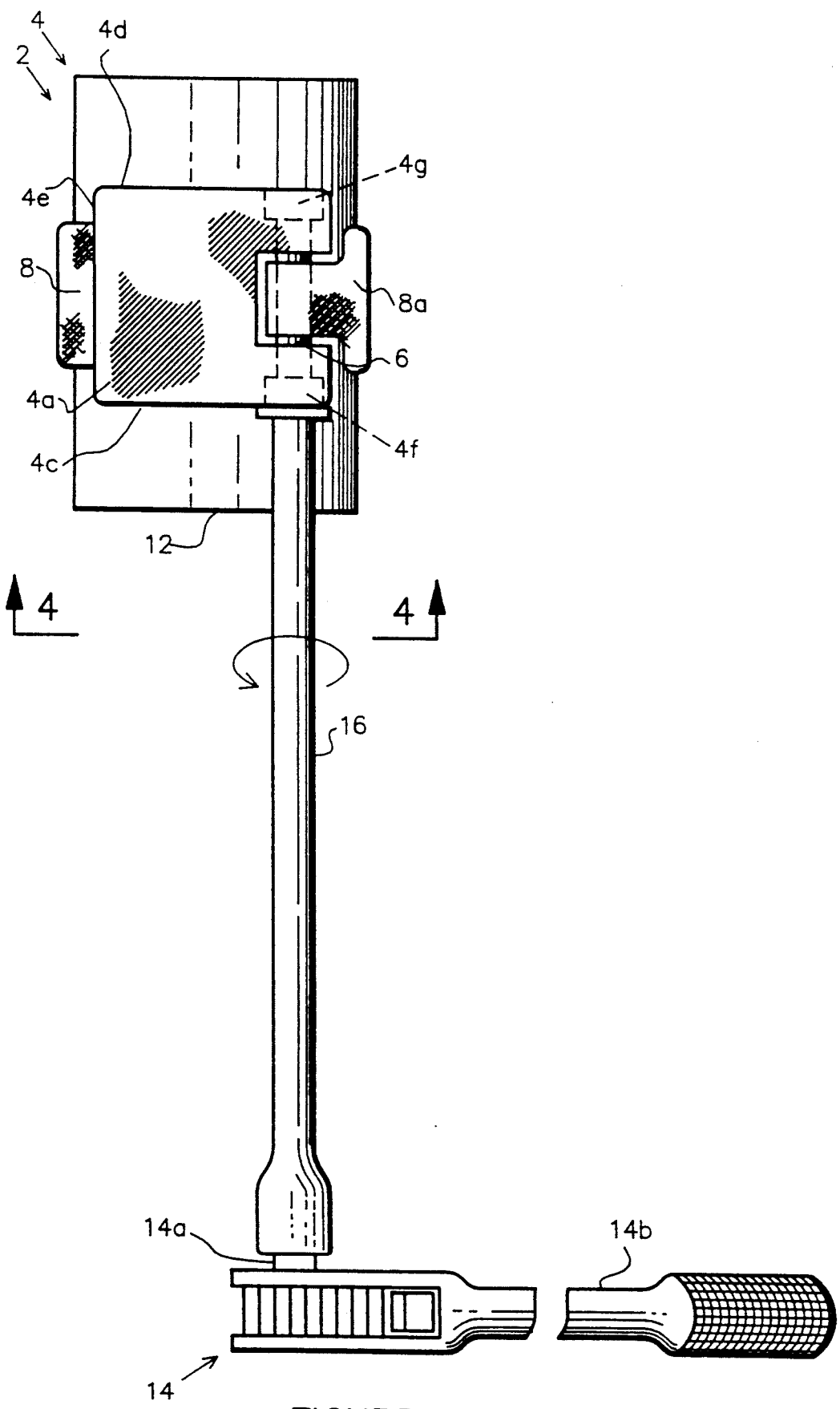
FIG. 3 is a top view of the ratchet tool in combination with a universal extension.
Figure 4:
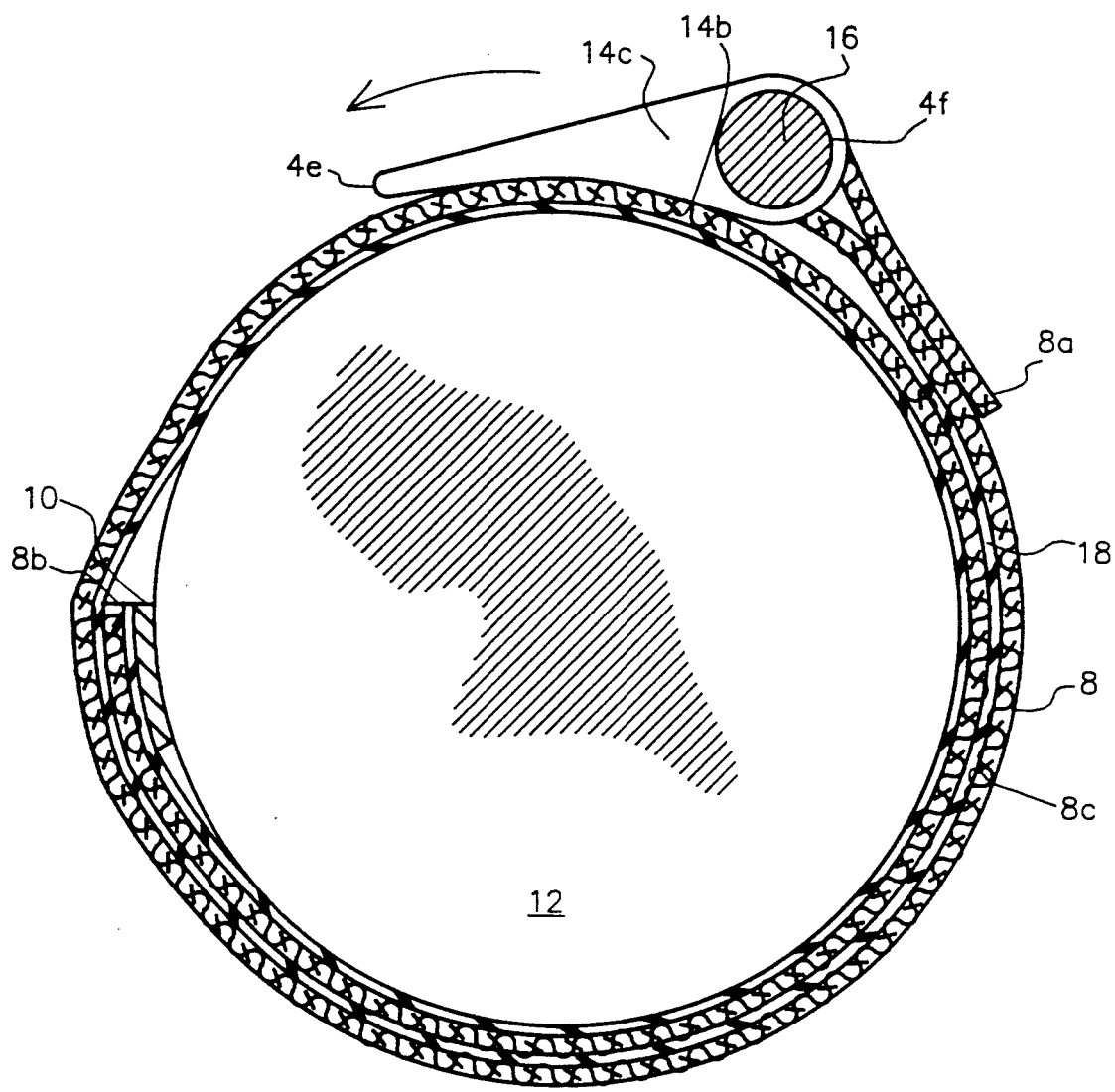
FIG. 4 is a cross-sectional view of the tool and extension shown in FIG. 3 taken along the cutting line 4—4.

The tool 2 comprises a plate or buckle 4 having a planar face 4a, a concave face 4b, a first side 4c, a second side 4d, and a third side 4e. There is a first square indentation 4f in the first side 4c, and a second square indentation 4g in the second side 4d of the buckle 4. A pin 6 connects the first and second indentations 4f and 4g in the first and second sides 4c and 4d of the buckle 4 to one another.

A belt 8 has first and second ends 8a and 8b, respectively. The first end 8a of the belt 8 is connected to the pin 6 in the buckle 4. The second end 8b of the belt 8 is connected to a magnet 10.

The belt 8 is wrapped around a workpiece 12 such as a fuel filter, an oil filter, or a pipe. One of the square indentations 4f or 4g is used to engage a ratchet 14a of a ratchet wrench 14 or a universal extension 16 connected to the ratchet wrench 14. When the handle 14b of the wrench 14 is moved to turn or rotate the ratchet 14a or extension 16, the concave face 4b of the buckle 4 is pressed against the workpiece 12, and causes the workpiece 12 to turn or rotate on its axis as the ratchet 14a or extension 16 is turned or rotated by manipulative movement of the handle 14b of the wrench 14. The magnet 10 augments the attachment of the belt 8 to metallic workpieces 12 such as metal filters and threaded pipes.

Preferably, the buckle 4 is made of metal. Even more preferably, the buckle 4 is made of aluminum, steel, or iron.

Preferably, the belt 8 is made of an elastomer, or an elastomer 18 is used to coat the surface 8c of the belt 8. Even more preferably, the belt 8 is made of rubber, or rubber 18 is used to coat the surface 8c of the belt 8.

The tool 2, or more specifically, the buckle 4 of the tool 2, is fabricated in at least four different sizes, to accommodate ratchet wrenches 14 having three-eights inch, one-half inch, three-quarters inch, and one-inch drives. The tool 2 can also be used with a ratchet wrench 14 combined with and connected to a universal extension 16.

The versatile tool 2 is beneficially used to remove and/or install various types and sizes of fuel and oil filters, to unscrew and/or screw different sizes of threaded pipe, to turn and/or twist fence posts, and to move and/or roll logs. The tool 2 can be used to loosen fence posts, or to string wire on fence posts. Many other uses of the present invention will be apparent to those skilled in the art.

While certain specific details and particular embodiments have been described to illustrate the present invention, it will be apparent to those skilled in the art that many modifications can be made therein without departing from the spirit and scope of the invention.

I claim:

1. A tool for use with a ratchet wrench for turning a workpiece, the ratchet wrench having a ratchet connected to a handle, the tool comprising:
    (a) a rigid plate-like member having a planar face and a concave face, and first, second, and third sides, the first and second sides being substantially parallel to one another, the third side being substantially perpendicular to the first and second sides, the first side including a square indentation which fits the ratchet;
    (b) a rigid, straight, elongated member connecting the indentation in the first side of the plate-like member to the second side of the plate-like member; and
    (c) an elongated flexible member having first and second ends, the first end of the elongated flexible member being connected to the elongated rigid member;

whereby when the elongated flexible member is wrapped around the workpiece, when the ratchet is engaged by the square indentation, and when the handle of the ratchet wrench is used to turn the ratchet, the concave face of the plate-like member is pressed against the workpiece and causes the workpiece to turn as the ratchet is turned.

2. The tool of claim 1, further comprising:
    (d) a magnet connected to the second end of the elongated flexible member, for holding the second end of the elongated flexible member in contact with a metallic workpiece.

3. The tool of claim 1, wherein the plate-like member is made of metal.

4. The tool of claim 1, wherein the surface of the elongated flexible member is made of an elastomer.

5. The tool of claim 1, wherein the surface of the elongated flexible member is made of rubber.

6. The tool of claim 1, wherein the elongated flexible member is made of an elastomer.

7. The tool of claim 1, wherein the elongated flexible member is made of rubber.

8. A tool for use with a ratchet wrench for turning a workpiece, the ratchet wrench having a ratchet connected to a handle, the tool comprising:

(a) a rigid plate-like member having a planar face and a concave face, and first, second, and third sides, the first and second sides being substantially parallel to one another, the third side being substantially perpendicular to the first and second sides, the first side including a square indentation which fits the ratchet, and the second side has a square indentation therein;

(b) a rigid, straight, elongated member connecting the indentation in the first side of the plate-like member to the indentation in the second side of the plate-like member; and (c) an elongated flexible member having first and second ends, the first end of the elongated flexible member being connected to the elongated rigid member; whereby, when the elongated flexible member is wrapped around the workpiece, when the ratchet is engaged by one of the square indentations, and when the handle of the ratchet wrench is used to turn the ratchet, the concave face of the plate-like member is pressed against the workpiece and causes the workpiece to turn as the ratchet is turned.

* * * * *